(12) United States Patent
Jonen et al.

(10) Patent No.: US 8,967,954 B2
(45) Date of Patent: Mar. 3, 2015

(54) INTERMEDIATE FLOOR FOR A RADIAL TURBINE ENGINE

(75) Inventors: Werner Jonen, Duisburg (DE); Peter Robens, Moers (DE)

(73) Assignee: Siemens Aktiengesellschaft, Müchen (DE)

( * ) Notice: Subject to any disclaimer, the term of this patent is extended or adjusted under 35 U.S.C. 154(b) by 341 days.

(21) Appl. No.: 13/509,097

(22) PCT Filed: Nov. 10, 2010

(86) PCT No.: PCT/EP2010/067174
§ 371 (c)(1),
(2), (4) Date: May 10, 2012

(87) PCT Pub. No.: WO2011/058034
PCT Pub. Date: May 19, 2011

(65) Prior Publication Data
US 2012/0230812 A1  Sep. 13, 2012

(30) Foreign Application Priority Data
Nov. 11, 2009 (DE) .......................... 10 2009 052 619

(51) Int. Cl.
*F04D 7/04* (2006.01)
*F04D 29/44* (2006.01)
(Continued)

(52) U.S. Cl.
CPC .............. *F04D 29/441* (2013.01); *B01D 45/06* (2013.01); *F04D 7/04* (2013.01); *F04D 31/00* (2013.01)
USPC ...................... 415/144; 415/169.1; 415/169.2; 415/169.3; 415/199.2

(58) Field of Classification Search
CPC ........... F04D 1/06; F04D 1/063; F04D 1/066;
F04D 17/12; F04D 17/122; F04D 17/125;
F04D 7/04; F04D 27/009; F04D 27/0207;
F04D 27/0215; F04D 27/023; F04D 29/441;
F04D 29/444; F04D 31/00; B01D 45/04;
B01D 45/06
USPC ........................... 415/144–145, 199.1–199.3, 415/169.1–169.4
See application file for complete search history.

(56) References Cited

U.S. PATENT DOCUMENTS

| 2,332,614 | A | 10/1943 | Swearingen |
| 6,210,104 | B1 * | 4/2001 | Schonenborn ............. 415/211.2 |

(Continued)

FOREIGN PATENT DOCUMENTS

| CN | 1179289 A | 4/1998 |
| CN | 2570462 Y | 9/2003 |

(Continued)

*Primary Examiner* — Christopher Verdier

(57) ABSTRACT

A radial turbomachine includes a radial diffuser channel with a diaphragm, a deflecting channel connecting to the radial diffuser channel downstream thereof, and a return flow channel connecting to the deflecting channel downstream thereof. The main flow direction of the radial diffuser channel runs radially from inside to outside. The main flow direction of the deflecting channel is deflected from radially outward to radially inward. The main flow direction of the return channel runs radially from outside to inside. The diaphragm comprises first, second and third outer surface sections. The first outer surface section has a convex shape for delimiting the deflecting channel. At least one consumption-gas removal channel is provided in the diaphragm so that, if the main flow in the deflecting channel comprises solid or liquid particles, a consumption gas can be discharged therefrom through the consumption-gas removal channel as low-particulate gas of a main flow.

8 Claims, 2 Drawing Sheets

(51) Int. Cl.
*F04D 31/00* (2006.01)
*B01D 45/06* (2006.01)

(56) References Cited

U.S. PATENT DOCUMENTS 6,273,674 B1  8/2001  Charron

2008/0279680 A1 * 11/2008 Nishida et al. ............. 415/198.1

FOREIGN PATENT DOCUMENTS

| DE | 235397 C | 6/1911 |
| FR | 1326166 A | 5/1963 |
| FR | 2574871 A1 | 6/1986 |
| FR | 2774137 A1 | 7/1999 |

* cited by examiner

INTERMEDIATE FLOOR FOR A RADIAL TURBINE ENGINE

CROSS REFERENCE TO RELATED APPLICATIONS

This application is the US National Stage of International Application No. PCT/EP2010/067174, filed Nov. 10, 2010, and claims the benefit thereof. The International Application claims the benefits of German application No. 10 2009 052 619.6 DE filed Nov. 11, 2009. All of the applications are incorporated by reference herein in their entirety.

FIELD OF INVENTION

The invention relates to a radial turbomachine having a radial diffuser channel with a diaphragm, the main flow direction through which runs radially from the inside outward, a deflecting channel, which connects to the radial diffuser channel downstream thereof and the main flow direction through which is deflected from radially outward to radially inward, and a return flow channel, which connects to the deflecting channel downstream thereof and the main flow direction through which runs radially from the outside inward, wherein the diaphragm has a first outer surface section having a convex shape for delimiting the deflecting channel, wherein at least one consumption-gas removal channel, which opens into the deflecting channel, is provided in the diaphragm so that, if the main flow in the deflecting channel contains solid or liquid particles, consumption gas can be removed as a low-particulate gas of a main flow from said main flow through the consumption-gas removal channel.

BACKGROUND OF INVENTION

One example of a radial turbomachine is a multistage single-shaft radial compressor, the individual stages of which have, as components for guiding the flow of process gas, an impeller, which is driven by a shaft, a radial diffuser, a deflecting channel and a return flow channel. The process gas flows first through the impeller, wherein the process gas enters the impeller in the axial direction and leaves the impeller in the radially outward direction. An increase in the static pressure takes place in the diffuser, which connects radially to the impeller and through which the process gas flows from the inside outward. In the multistage radial compressor, the process gas flows through a multiplicity of radial compressor stages, which are arranged axially in series on the shaft and each have the impeller and the diffuser. In each of the radial compressor stages, the gas flow is furthermore guided back radially in the direction of the shaft downstream of the diffuser in order to enter the impeller of a subsequent radial compressor stage. The return flow is accomplished by means of a deflecting channel, which deflects the flow direction of the process gas from radially outward to radially inward. Connected to the deflecting channel on the downstream side is a return flow channel, which extends in the radial direction in order to guide the flow of process gas to the inlet of the impeller arranged downstream. After flowing through the final radial compressor stage, the process gas flows into a spiral housing which connects to the final radial compressor stage and to which a radial compressor stub is connected, through which the process gas flows off. The practice of removing part of the process gas from the main flow in order to obtain cooling gas, e.g. to cool a motor or to cool magnetic bearings, is known.

However, among the disadvantages of removing the partial gas stream from the main flow is that, in many cases, the quality of the partial gas stream is inadequate in terms of purity requirements since the partial gas stream may have an excessive moisture content, for example. This can lead to damage to the components that come into contact with the partial gas stream and, as a result, the maintenance cycles of the radial turbocompressor are short.

FR 1 326 166 A has disclosed a boundary layer extraction system for a compressor of the type in question which is suitable in principle for extracting clean process gas.

SUMMARY OF INVENTION

It is the object of the invention to provide a radial turbomachine which has the diaphragm, wherein the radial turbomachine can be operated reliably.

The invention provides a radial turbomachine having a diaphragm, in which the radial turbomachine has a return flow channel and an inner casing which is shaped and arranged in such a way that the inner casing, together with the third outer surface section of the diaphragm, forms the return flow channel, wherein at least one guide vane is arranged in the return flow channel, which guide vane bridges the return flow channel and in which the consumption-gas removal channel is routed from the diaphragm to the inner casing.

The invention advantageously makes it possible, in a radial turbomachine, to remove the dry and clean partial gas stream from the possibly particulate- and/or water droplet-laden process gas stream in the annular space of a radial diffuser stage of the radial turbomachine. According to the invention, this is achieved especially by means of the convex shape of the first outer surface section of the diaphragm and by means of the special arrangement, in accordance with the invention, of the deflecting channel and the mouth thereof. The invention is based on the concept of providing the removal point for the partial gas stream in the deflecting channel in the region of maximum flow deflection, i.e. in the inner arc of the deflecting channel. Solid or liquid particles, e.g. dirt particles or water droplets, cannot completely follow the deflection of the gas flow owing to the inertia thereof.

According to one embodiment of the invention, the diaphragm delimits the radial diffuser channel by means of a second outer surface section and delimits the return flow channel by means of a third outer surface section, wherein the first outer surface section is arranged between the second and the third outer surface section, relative to the main flow direction. In this embodiment of the invention, the inner boundaries of the radial diffuser channel, of the deflecting channel and of the return flow channel of the diaphragm can advantageously be provided as an integral component in which the mouth section and a section of the consumption-gas removal channel adjoining the mouth section can be integrally arranged.

According to one embodiment of the invention, the consumption-gas removal channel opens into the deflecting channel in the region of the transition between the first outer surface section and the third outer surface section. In this embodiment, the consumption gas can advantageously be removed in a particularly effective manner as a low-particulate gas of the main flow from said main flow through the consumption-gas removal channel. Advantageous use is made of the fact that the process gas flow has already been deflected by a large deflection angle in the vicinity of the return flow channel during operation, with the result that a particularly small amount of solid or liquid particles comes into the vicinity of the mouth of the consumption-gas removal channel since the solid or liquid particles cannot completely follow the deflection of the gas flow. Another advantage is that if the diaphragm is used in a radial turbomachine with a vertical axis of rotation and with a main flow direction running from the top down, the solid or liquid particles move away from the mouth of the consumption-gas removal channel or do not reach the mouth owing to the force of gravity, and this improves the purity of the consumption gas.

The consumption-gas removal channel preferably runs in the diaphragm in a plane in which the axis of the diaphragm is situated. Moreover, the consumption-gas removal channel is arranged relative to the axis of the diaphragm so as to slope toward the third outer surface section. If the diaphragm is installed in the radial turbomachine with a vertical axis of rotation in this embodiment, the slope of the consumption-gas removal channel advantageously contributes to fewer solid or liquid particles being removed through the consumption-gas removal channel with the consumption gas, thereby further improving the quality of the consumption gas.

According to one embodiment of the radial turbomachine according to the invention, the radial turbomachine has the return flow channel and an inner casing which is shaped and arranged in such a way that the inner casing, together with the third outer surface section of the diaphragm, forms the return flow channel. Moreover, at least one guide vane is arranged in the return flow channel, which guide vane bridges the return flow channel and in which the consumption-gas removal channel is routed from the diaphragm to the inner casing. In this embodiment, there is advantageously no need to provide a separate pipe conduit in the return flow channel to bridge the latter and carry the flow of consumption gas out of the radial diffuser stage.

According to one embodiment, the consumption-gas removal channel can furthermore extend in the axial direction in the guide vane. According to a development of this embodiment, the consumption-gas removal channel is arranged on the vane chord and in the region of the greatest profile thickness of the guide vane. It is thus advantageously possible for the consumption-gas removal channel to have a large diameter, thereby advantageously making it possible to increase the flow rate of the consumption gas removed.

According to one embodiment of the invention, the consumption-gas removal channel is furthermore provided in each guide vane and correspondingly in the diaphragm. In this embodiment, it is advantageously possible to further increase the flow rate of the consumption gas.

BRIEF DESCRIPTION OF THE DRAWINGS

A preferred embodiment of a diaphragm according to the invention and of a radial compressor stage according to the invention is explained below with reference to the attached schematic drawing, in which.

DETAILED DESCRIPTION OF INVENTION

Figure 1:
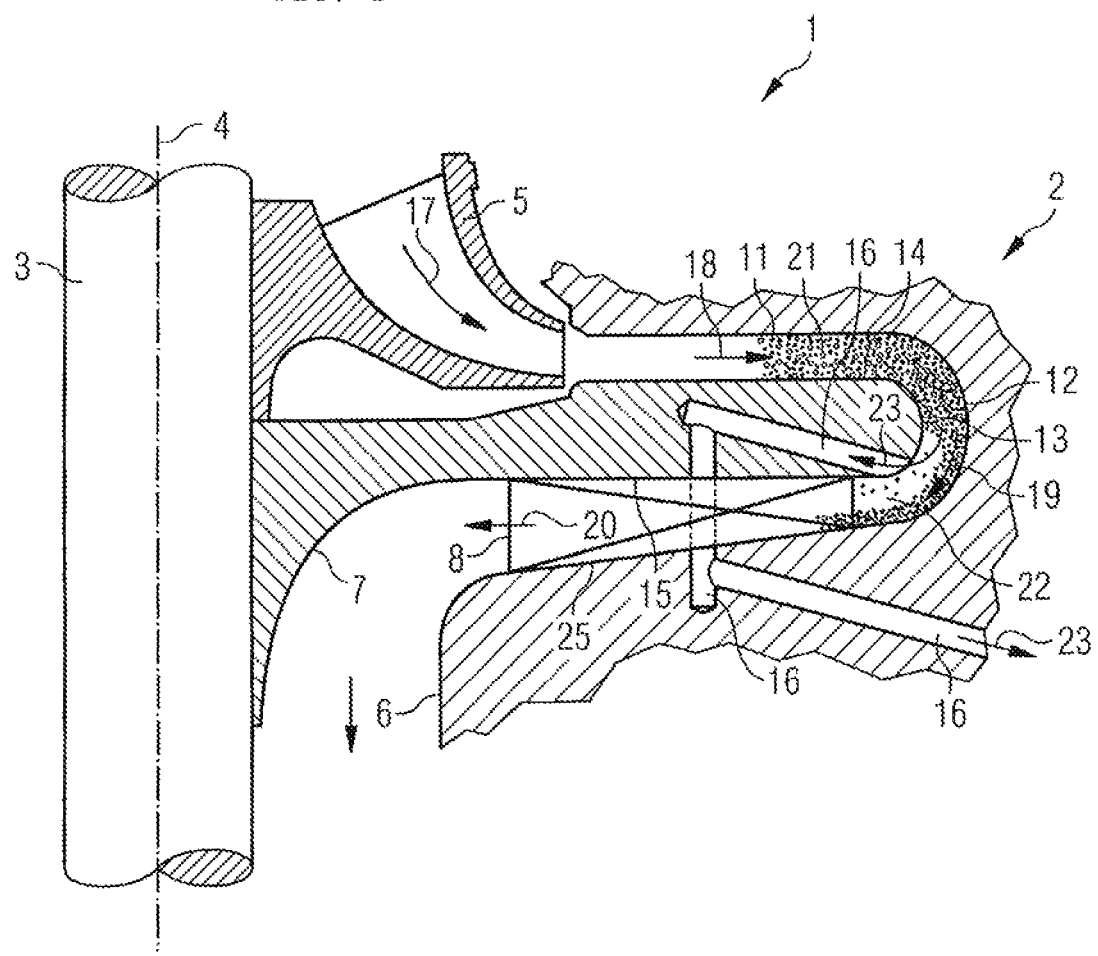
FIG. 1 shows a partial sectional view of a radial compressor stage of a radial compressor according to the invention with a vertical axis of rotation and with a diaphragm according to the invention.
Figure 2:
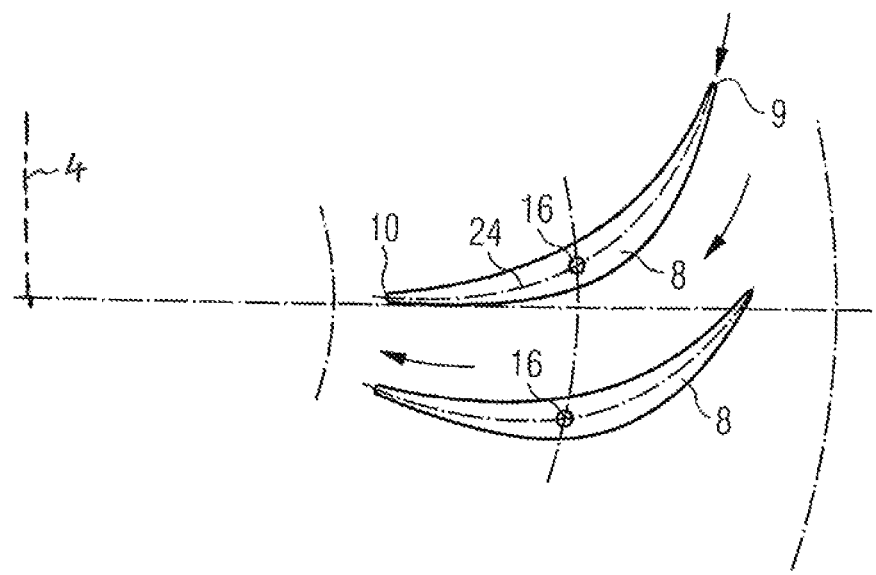
FIG. 2 shows a sectional view of guide vanes of the radial compressor stage according to one illustrative embodiment of the invention.

In FIG. 1, a radial compressor stage 2 of a radial compressor 1 according to the invention in accordance with one illustrative embodiment of the invention is shown schematically, wherein the radial compressor stage 2 has the diaphragm 7 according to the invention. Schematic sectional views of guide vanes 8 of the radial compressor stage 2 are furthermore shown in FIG. 2. The radial compressor 1 shown in FIG. 1 has an inner casing 6, in which is arranged a radial compressor impeller 5, which is seated on a shaft 3 and is driven by the latter. By means of the radial compressor impeller 5, the process gas is deflected radially outward. The direction of the main flow 17 in the radial compressor impeller 5 is indicated by an arrow in FIG. 1. A radial diffuser channel 11, a deflecting channel 12 and a return flow channel 25 furthermore connect to the radial compressor impeller 5 on the downstream side. The main flow 18 in the radial diffuser channel 11, the main flow 19 in the deflecting channel 12 and the main flow 20 in the return flow channel 20 are each indicated by arrows.

A diaphragm 7 is furthermore arranged in the inner casing 6, said diaphragm having a first outer surface section 13, a second outer surface section 14 and a third outer surface section 15. With the outer surface sections 13, 14, 15, the diaphragm 7 forms inner walls of the radial diffuser channel 11, of the deflecting channel 12 and of the return flow channel 25. A respectively oppositely situated inner wall is formed by the inner casing 6. The width and shape of each of the flow channels 11, 12, 25 is thus determined by the shape of the inner casing 6 and by the shape and arrangement of the diaphragm 7. According to FIG. 1, the second outer surface section 14 and the third outer surface section 15 are substantially rectilinear in cross section, whereas the first outer surface section 13 is of convex shape. The deflecting channel 12 deflects the gas flow through 180° in order to feed the process gas to the next radial compressor impeller 5 situated downstream.

The diaphragm 7 of the illustrative embodiment in FIG. 1 is designed as a rotationally symmetrical integral component, through which the shaft 3 of the radial compressor 1 is passed. In the interior of the diaphragm 7 there is a consumption-gas removal channel 16, which opens at the surface of the diaphragm 7 in the region of the first outer surface section 13, i.e. in the convex part of the diaphragm 7. In this case, the consumption-gas removal channel 16 slopes and opens into the rear part of the deflecting channel 12 into the process gas flow. The consumption-gas removal channel 16 is provided for the purpose of removing a partial gas stream from the process gas flow through the radial compressor stage 2. This is illustrated by arrows in FIG. 1.

Since, according to the invention, the consumption-gas removal channel 16 opens into the convex first outer surface section 13, a clean and dry partial gas stream can be diverted from the main flow of the process gas. As shown in FIG. 1, water droplets 21 or particles contained in the process gas flow, which have a higher density than the process gas, have migrated radially outward, closer to the inner wall of the deflecting channel 12 formed by the inner casing 6. A zone 22 of the deflecting channel 12 containing few droplets has formed in the region close to the mouth of the consumption-gas removal channel 16, with the result that fewer solid or liquid particles can enter the consumption-gas removal channel 16 and hence a partial gas stream containing few solid or liquid particles flows into the consumption-gas removal channel 16.

In the embodiment shown in FIG. 1, guide vanes 8 are arranged in the return flow channel 25, removing the swirl from the process gas flow. In the illustrative embodiment shown in FIG. 1, the guide vanes 8 extend over a large area in the direction of flow in the return flow channel 25. In FIG. 1, the arrangement of the guide vanes 8 is furthermore shown by way of example in an axial section by means of guide vanes 8 illustrated in cross section. The guide vanes 8 each have a leading edge 9 and a trailing edge 10 and are aerodynamically shaped and arranged to deflect the flow, as shown in the corresponding cross-sectional view in FIG. 1. The guide vanes 8 furthermore form a mechanical connection between the inner casing 6 and the diaphragm 7.

In order to transfer the gas that has flowed into the sloping consumption-gas removal channel 16 at the first outer surface section 13, e.g. for use as a cooling gas for a motor, a section of the consumption-gas removal channel 16 which bridges the return flow channel 25 is provided between the diaphragm 7 and the inner casing 6, to which section a sloping section of the consumption-gas removal channel 16 running in the inner casing 6 and parallel to consumption-gas removal channel section 16 in the diaphragm 7 connects in order to carry the consumption gas stream 23 out of the radial compressor stage 2.

The section of the consumption-gas removal channel 16 which runs between the inner casing 6 and the diaphragm 7 is arranged in the guide vanes 8, as shown in the cross-sectional views of the guide vanes 8 in FIG. 1. At the same time, the consumption-gas removal channel 16 runs through the chord 24 of the guide vane 8 in the region of the thickest profile diameter thereof.

One or more sloping consumption-gas removal channels 16 can be provided, each having a mouth at the first outer surface section 13 of the diaphragm 7 and each running through a guide vane 8. Admittedly, the invention is explained by means of a radial compressor according to the illustrative embodiment in FIG. 1. However, the invention can also be applied to a radial pump.

The invention claimed is:

1. A radial turbomachine, comprising:
   a radial diffuser channel with a diaphragm, the radial diffuser channel having a first main flow direction through it, which runs radially from the inside outward,
   a deflecting channel, which connects to the radial diffuser channel downstream thereof, the deflecting channel having a second main flow direction through it, which is deflected from radially outward to radially inward, and
   a return flow channel, which connects to the deflecting channel downstream thereof, the return flow channel having a third main flow direction through it, which runs radially from the outside inward,
   wherein the diaphragm has a first outer surface section, a second outer surface section, and a third outer surface section, the first outer surface section having a convex shape for delimiting the deflecting channel,
   wherein at least one consumption-gas removal channel, which opens into the deflecting channel, is provided in the diaphragm, so that, if the second main flow in the deflecting channel contains solid or liquid particles, consumption gas can be removed as a low-particulate gas from said second main flow through the consumption-gas removal channel,
   wherein the radial turbomachine further includes an inner casing which is shaped and arranged in such a way that the inner casing, together with the third outer surface section of the diaphragm, forms the return flow channel, and
   wherein at least one guide vane is arranged in the return flow channel, which guide vane bridges the return flow channel, wherein the consumption-gas removal channel is routed from the diaphragm to the inner casing through the guide vane.

2. The radial turbomachine as claimed in claim 1, wherein the diaphragm delimits the radial diffuser channel via the second outer surface section and delimits the return flow channel via the third outer surface section, wherein the first outer surface section is arranged between the second and the third outer surface section, relative to the main flow direction.

3. The radial turbomachine as claimed in claim 2, wherein the consumption-gas removal channel opens into the deflecting channel in the region of the transition between the first outer surface section and the third outer surface section.

4. The radial turbomachine as claimed in claim 2, wherein the consumption-gas removal channel runs in the diaphragm in a plane in which the axis of the diaphragm is situated, and is arranged relative to the axis of the diaphragm so as to slope toward the third outer surface section.

5. The radial turbomachine as claimed in claim 1, wherein the radial turbomachine has a vertically arranged axis of rotation, wherein the radial turbomachine has a fourth main flow direction which runs in a vertically downward direction, wherein the radial turbomachine includes a compressor stage, wherein the diaphragm is included in the compressor stage.

6. The radial turbomachine as claimed in claim 1, wherein the consumption-gas removal channel extends in the axial direction in the guide vane.

7. The radial turbomachine as claimed in claim 5, wherein the consumption-gas removal channel is arranged on the vane chord and in the region of the greatest profile thickness of the guide vane.

8. The radial turbomachine as claimed in claim 5, wherein the consumption-gas removal channel is provided in each guide vane and correspondingly in the diaphragm.

* * * * *